Aug. 31, 1954   F. L. WASSELL   2,687,732
CARD MECHANISM FOR BUSINESS MACHINES
Filed Dec. 31, 1949   2 Sheets-Sheet 1

INVENTOR
FRANK LLOYD WASSELL
BY
his ATTORNEYS

Aug. 31, 1954  F. L. WASSELL  2,687,732
CARD MECHANISM FOR BUSINESS MACHINES
Filed Dec. 31, 1949  2 Sheets-Sheet 2
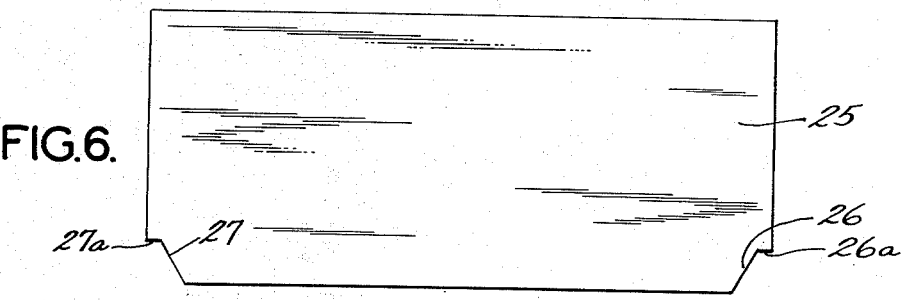
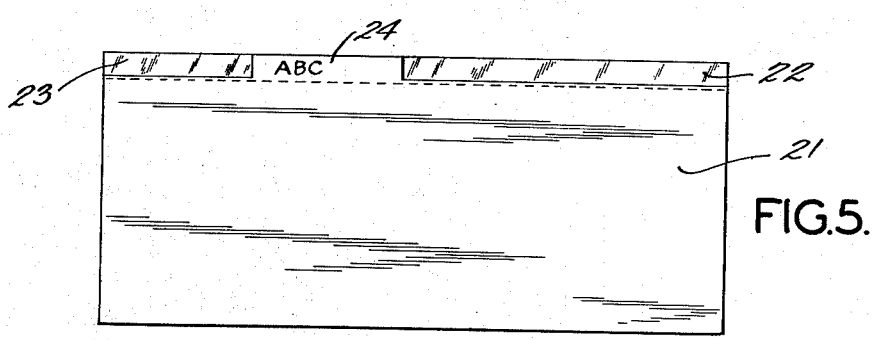
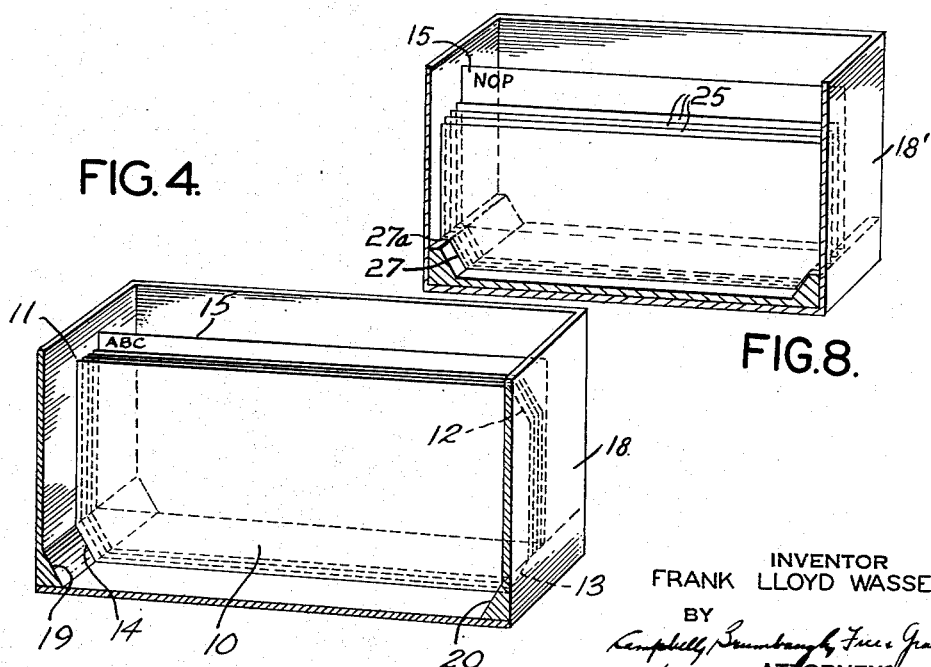
INVENTOR
FRANK LLOYD WASSELL
BY
his ATTORNEYS Patented Aug. 31, 1954

2,687,732

UNITED STATES PATENT OFFICE 2,687,732

CARD MECHANISM FOR BUSINESS MACHINES

Frank Lloyd Wassell, Westport, Conn., assignor to Georgene Parkin Wassell, Westport, Conn.

Application December 31, 1949, Serial No. 136,367

1 Claim. (Cl. 129—16)

1

The present invention relates to business machine cards and embodies, more specifically, an improved form of card (as well as a card filing system) by means of which cards may be utilized in business machines of the kind now generally available and, at the same time, adapted to be used for purposes of guiding or indexing when the cards are not being used in the machines, but, rather, are maintained in receptacles such, for example, as filing receptacles.

Another object of the invention is to provide business machine cards and filing means therefor by means of which the cards may be utilized not only as mechanism by means of which tabulating may be accomplished and as a means for containing information or subject matter, but also as a means for guiding to facilitate access to desired specific cards or a group of cards.

The requirements of the operation of business machines are such that the tabulating or subject matter cards used therein must have precise dimensions, and the shape thereof must be similarly precise and must follow a pattern that permits of but very little modification. For example, it is not permissible to form tabs on business machine cards because those tabs would interfere with the operation of the machine. As a result, it has not been possible heretofore to provide guide tabs such as would be very helpful in indexing cards of this character. It has thus been necessary to provide additional index cards to guide the user to the individual cards or groups of cards as they are maintained when not in use in the business machine.

As an illustration of the foregoing, with present day business machine cards, it has heretofore been necessary, because of the extremely precise dimensional and form requirements imposed by the business machines, to furnish extra guide or index cards which are provided with tabs and, therefore, cannot be run through the machine. As a result, when the business machine cards are run through the machine, these guide cards must be removed and then, after the tabulating or other machine operation, replaced in their proper positions in order that convenient access and guiding may be had to individual cards or groups of cards. This is a difficult and laborious task, and therefore the practice heretofore has been to use relatively few guide cards with the result that the business machine cards have not been maintained effectively guided or indexed and, therefore, have required a relatively great amount of labor to use as an informational file.

Inasmuch as the precise nature of the corner of the cards for use in business machines is not critical, it has heretofore been the practice of bevelling one corner of the rectangular card to facilitate filing of the cards in upright and uniform position, the bevelled corner of all of the cards naturally being in the same location in the drawer or compartment in which the cards are maintained. In card filing systems generally where the profile or shape of the card is not critical, there have been provided heretofore vast numbers of card shapes and forms to facilitate easy guiding and indexing, but as above mentioned, the shape variations of these previous systems have prevented the use of such cards in business machines where the outline of the card must be maintained rigidly within prescribed dimensions (usually rectangular) in order that the cards may be properly processed through the machine without interfering with the operation thereof.

An object of the present invention is to provide a card structure and a file therefor by means of which the cards may be utilized as the tabulating or subject matter cards in the operation of business machines, at the same time being formed with means whereby guiding or indexing of the cards may be facilitated. With such structure, the cards may be used not only for the tabulating operations performed by business machines, but the business machine cards may serve as guide cards for quick reference in extracting old cards and filing new cards, or for reference, while being maintained in the storage files, for such purposes as credit, billing, inventory, service, production, and a vast number of other uses without impairing the serviceability of the cards in providing subject matter or information in tabulated form for use in operating business machines.

Another object of the invention is to provide a business machine card and file structure by means of which business machine cards may be used as an informational card file, fully guided, and as fully implemented as a vertical informational card file of standard form.

Numerous other objects and advantages of the invention will be apparent as it is described in greater detail in connection with the accompanying drawings, wherein Figure 1 is a plan view of a business machine card constructed in accordance with the present invention, such card being adapted to receive information or subject matter in the form of perforations, indicia or legends, or other media;

Figure 4 is a perspective view showing the subject matter and guiding cards of Figures 1 and 2 placed in the tray or receptacle of Figure 3 and illustrating the manner in which the cards function to perform the service hereinabove described;

Figure 5 is a view similar to Figure 2, showing a modified form of guide card;

Figure 6 is a plan view showing a further modified form of guide or subject matter card;

Figure 8 is a perspective view, similar to Figure 4, showing the guide and subject matter cards of Figures 2 and 6, respectively, placed in the tray or receptacle of Figure 7.

Referring to the above drawings, 10 indicates a business machine card of rectangular form having one right angle corner 11 and three bevelled corners 12, 13, and 14, respectively. This card is formed with the usual columns and rows having suitable indicia thereon and adapted to be punched or otherwise treated in order that they may carry desired information for tabulating purposes when the cards are passed through a business machine for tabulating or performing other standard machine operations. The specific nature of the indicia or other subject matter upon the card forms no part of the present invention, and no attempt is made herein to describe the manner in which the subject matter is applied to or maintained by the card 10.

Figure 1:
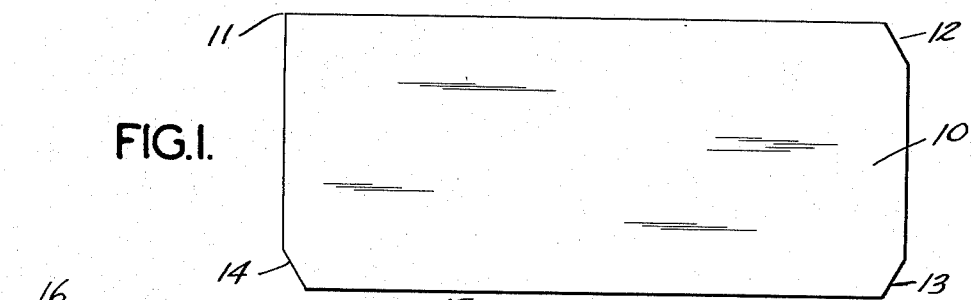
Figure 2:
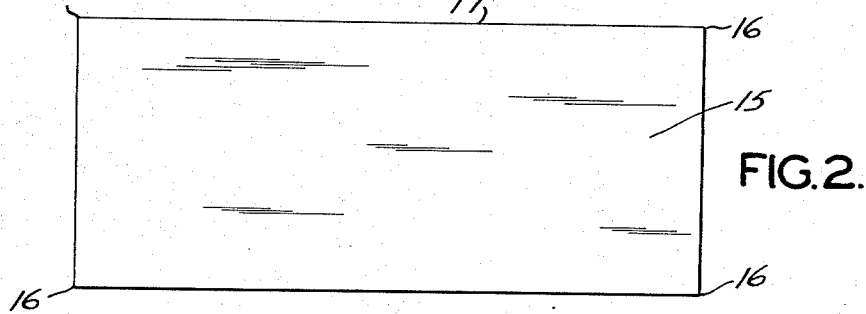
Figure 2 is a plan view of a card adapted to carry the information referred to in connection with the card shown in Figure 1, but being formed to serve as a guide card when placed in the file or other receptacle in which the cards are normally maintained when not in use in the business machine.

In addition to the subject matter cards 10, guide cards 15 are provided (Figure 2), these cards being of the same length and breadth as the cards 10, but being formed with four right angled corners 16. The cards 15 may be provided with the lines, columns, and other indicia mentioned above in connection with the cards 10 and, adjacent the upper horizontal edges 17 thereof, suitable guiding indicia is provided in order that the cards 15 may serve as guide cards, as illustrated in Figure 4. To enable the cards 10 and 15 to be utilized effectively, a receptacle 18 (Figure 3) is provided, sloping corners 19 and 20 being provided at the bottoms of the receptacle of such form as to lie adjacent the bevelled corners 13 and 14 of the cards 10. In this fashion, the bevelled corners 13 and 14 of the cards 10 lie against the sloping corners 19 and 20, and the bottom edges of the cards 10 lie against the bottom of the tray or receptacle 18, as illustrated in Figure 4. The sloping corners or projections 19 and 20 thus prevent the cards 15 from following the cards 10 down to the bottom of the tray or receptacle 18 and cause the portion of the cards 15 adjacent the top edge 17 to be exposed, as illustrated in Figure 4. The indicia or subject matter adjacent the top edge 17 thus serves as a guide to the card 15 and to adjacent subject matter cards 10.

Figure 3:
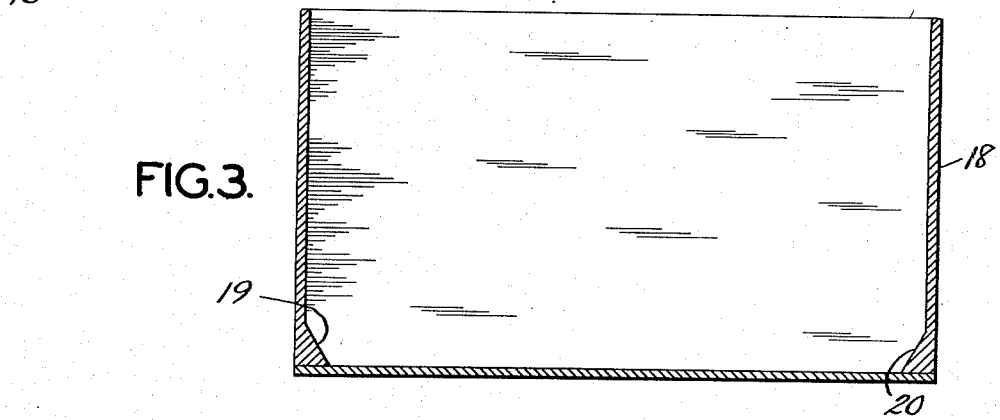
Figure 3 is a view in cross-section showing a tray or other receptacle within which business machine cards may be maintained to serve as guides or indexes.

Quite naturally, the cards may be stacked or maintained in trays with their long dimensions horizontal or with their short dimensions horizontal, in which latter event the trays would be narrow and deep rather than wide and shallow, as illustrated in Figures 3 and 4.

As illustrated in Figure 5, a modified form of guide card is illustrated at 21 as being formed with transparent portions 22 and 23 adjacent the upper edge thereof, the guiding indicia being provided in the space 24. The transparent portions thus enable the guiding indicia of adjacent guide cards to be readily seen.

Figure 7:
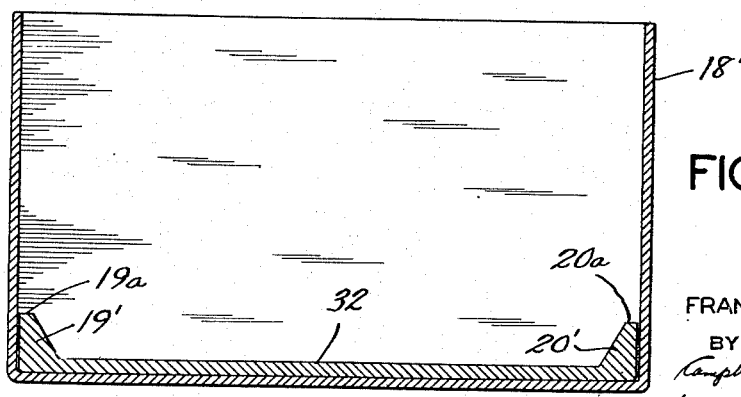
Figure 7 is a view showing a form of removable or auxiliary tray bottom member adapted to make standard forms of card trays suitable for use with business machine cards formed in accordance with the present invention.

In Figure 6, a further modification of the invention has been illustrated wherein the subject matter cards are illustrated at 25 as being provided with bevelled corners 26 and 27 formed with shoulders 26a and 27a, respectively. Cooperating with these shoulders are ledges 19a and 20a, respectively, of ribs 19' and 20', respectively (Figure 7). The shoulders 26a and 27a, and ledges 19a and 20a serve as an effective support not only for the cards of the form shown in Figure 6, but also for the guide cards of the form shown in Figure 2.

In this fashion, the bevelled cards 25 will nest within the tray and the uncut cards 15 will project upwardly from the bottom of the tray and be exposed above adjacent cards with bevelled lower corners. This is illustrated in Figure 8 and provides a means of guiding or indexing the cards for ready viewing and guiding, or charting.

With reference to Figure 7, there is illustrated a modified form of tray or receptacle 18', similar in form to the tray 18 of Figure 3, but having a removable bottom portion 32 formed with corner members 19' and 20'. The removable bottom portion is adapted to be received within the standard card tray or receptacle as used in conventional forms of files in which the information cards are maintained in generally vertical position. As above mentioned, the ribs 19' and 20' are formed with ledges 19a and 20a upon which the bottom corners of the guide cards 15 of Figure 2 or the shoulders 26a and 27a of Figure 6, rest. In this fashion, standard forms of trays may be readily converted to use in connection with business machine card files as herein described merely by inserting the replaceable or removable tray member 32 into the bottom thereof.

It is to be understood that it is essential that all of the cards, whether they are subject matter cards only, or subject matter as well as guiding cards, are formed of the same shape along their tops, bottoms, and sides, and that the variations in shape occur only at the corners. This permits the cards to be utilized in business machines and, at the same time, provides an effective guide mechanism by means of which the cards may be utilized effectively while they are maintained in their receptacles when not in use in the machines. In other words, business machine cards having the precise dimensional and shape limitations required for processing through business machines may be maintained for use, not only in the operation of the business machines, but also as an informational card file as fully guided, implemented, and informative as a standard form of vertical card file with tabs and similar signalling or indexing means. The structure is such that the entire group of cards, including the guide cards, may be processed by the business machine and returned in mass to the card file receptacles or trays where the guide cards automatically assume the desired degree of prominence for guiding purposes merely by the act of placing the entire group of cards in the tray. Obviously the arduous task of separately replacing or inserting the guide cards in their proper positions, as has heretofore been necessary, is avoided by the present invention.

While the invention has been described with specific reference to the accompanying drawings, it is not to be limited save as defined in the appended claim.

I claim:

Card mechanism for business machines comprising in combination a majority of subject matter cards, a minority of guide cards, and a filing tray for receiving and holding upright groups of the subject matter cards and individual guide cards separating adjacent groups of subject matter cards; the subject matter cards and the guide cards having parallel sides and parallel top and bottom edges and all having the same thickness and overall dimensions from top to bottom and side to side; the side and bottom edges of all the guide cards forming square corners, the lower corners of all the subject matter cards being cut away to form shoulders a given distance above the bottom edges of said cards, said given distance being but a small fraction of the distance between the top and bottom edges; and the tray having two interior ledges, one at each side thereof engageable with the lower corners of the guide cards to maintain the guide cards at a higher elevation in the tray than the subject matter cards, the upper supporting surfaces of said ledges being spaced from the bottom of the tray a distance approximately equal to said given distance.

References Cited in the file of this patent

UNITED STATES PATENTS

| Number | Name | Date |
| --- | --- | --- |
| 1,383,684 | Wernery | July 5, 1921 |
| 1,734,128 | Hastings | Nov. 5, 1929 |
| 2,000,657 | Best | May 17, 1935 |
| 2,095,063 | Graf | Oct. 5, 1937 |
| 2,503,658 | Crane | Apr. 11, 1950 |

FOREIGN PATENTS

| Number | Country | Date |
| --- | --- | --- |
| 645,413 | Germany | May 28, 1937 |
| 695,620 | Germany | Aug. 29, 1940 |